US 6,631,794 B1

(12) United States Patent
Goldberg et al.

(10) Patent No.: US 6,631,794 B1
(45) Date of Patent: Oct. 14, 2003

(54) DRIVE UNIT ASSEMBLY WITH A REGENERATIVE RETARDER

(75) Inventors: Ira B. Goldberg, Thousand Oaks, CA (US); Benjamin R. Jones, Thousand Oaks, CA (US); Ted M. McKinney, Riverside, CA (US); Yngve Naerheim, Thousand Oaks, CA (US); Patricia H. Cunningham, Thousand Oaks, CA (US); Dale K. Bell, Ortonville, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 40 days.

(21) Appl. No.: 09/550,032

(22) Filed: Apr. 14, 2000

(51) Int. Cl.$^7$ ................................................. B60L 7/00
(52) U.S. Cl. ...................................... 188/158; 188/164
(58) Field of Search ............................ 303/3, 20, 151, 303/152; 188/156, 157, 158, 159, 161, 162, 164

(56) References Cited

U.S. PATENT DOCUMENTS

| | | | | |
|---|---|---|---|---|
| 3,601,641 A | * | 8/1971 | Baermann | 310/105 |
| 3,889,140 A | * | 6/1975 | Baermann | 310/103 |
| 5,212,419 A | * | 5/1993 | Fisher et al. | 310/254 |
| 5,253,929 A | * | 10/1993 | Ohori | 303/3 |
| 5,476,310 A | * | 12/1995 | Ohtsu et al. | 303/152 |
| 5,511,859 A | * | 4/1996 | Kade et al. | 303/152 |
| 5,707,115 A | * | 1/1998 | Bodie et al. | 303/152 |
| 5,743,599 A | * | 4/1998 | Henderson et al. | 303/152 |
| 6,155,365 A | * | 12/2000 | Boberg | 303/152 |

* cited by examiner

*Primary Examiner*—Jack Lavinder
*Assistant Examiner*—T. Williams
(74) *Attorney, Agent, or Firm*—Carlson, Gaskey & Olds

(57) ABSTRACT

A vehicle drive unit assembly includes an axle extending between a pair of wheels, a braking system for slowing and stopping the vehicle, and a retarding system located on the axle for assisting the braking system. The axle has a housing and an axle shaft that receives input from an engine and driveshaft to drive the wheels. The braking system includes a brake member supported on each of the wheels and an actuator for selectively moving the brake members between an unactuated position and an actuated position. The braking system produces a braking force to slow or stop the rotation of the wheels when the brake is in the actuated position. The retarding system includes a plurality of magnets supported for rotation with the axle shaft and an inductor held fixed to the axle housing. The retarding system produces a retarding force as the magnets rotate with respect to the inductor to slow the rotation of the wheels when the actuator moves the brake members to the actuated position. Thus, the retarding system assists the braking system to slow and stop the vehicle.

27 Claims, 2 Drawing Sheets

DRIVE UNIT ASSEMBLY WITH A REGENERATIVE RETARDER

BACKGROUND OF THE INVENTION

This invention relates to a drive unit assembly using an electromagnetic retarding system on an axle to produce a retarding force that works with a vehicle braking system to slow and stop the vehicle. The retarding system is also used to generate electrical energy, which is stored for use in operating various vehicle systems and may include providing driving power through electrical or hydraulic means.

Vehicles often use retarders to assist vehicle braking systems. Vehicle retarders work in conjunction with the braking system to slow and/or stop the vehicle. Vehicles that use retarders usually experience increased brake lining durability because the vehicle brakes do not need to provide the total braking force for the vehicle. Retarders are typically integrated into any of various vehicle systems. These retarders are often complex, expensive, and can create additional pollution or increase engine wear. Also, when maintenance is required the operation of other vehicle systems can be affected.

Also, because the retarders are powered by the vehicle either a separate power supply is required or less power is available to run other vehicle systems. This decreases the overall efficiency and fuel economy of the vehicle.

Thus, it is desirable to have a simplified retarding system that is incorporated into a drive train or axle to increase packaging space at the wheel ends. It is also desirable to have a retarding system that works efficiently without draining vehicle power. This will improve fuel economy for the vehicle while increasing the durability of brake lining material.

SUMMARY OF THE INVENTION

A vehicle drive unit assembly utilizes an electromagnetic retarding system that assists a vehicle braking system in slowing and stopping the vehicle. The retarding system also generates energy that is stored for later use. The drive unit assembly includes an axle extending between a pair of wheels and has a rotating member for driving the wheels. The braking system includes a brake member supported on each of the wheels and an actuator for selectively moving the brake members between an unactuated position and an actuated position. The braking system produces a braking force to slow the rotation of the wheels when the brake members are in the actuated position. The retarding system has at least one magnet supported for rotation with the rotating member and an inductor held fixed independently from the magnet. The retarding system produces a retarding force as the magnet rotates with respect to the inductor to slow the rotation of the wheels when the actuator moves the brake members to the actuated position. Additionally, as the magnets rotate with respect to the inductor, electrical energy is created and stored in an accumulator such as a battery, capacitor, or is used to power a pump for a hydraulic or pneumatic accumulator. This stored energy is released back to the vehicle drive train under certain conditions.

This unique retarding system increases brake lining durability and improves fuel economy. Also, energy generated by the magnets as the magnets rotate with respect to the inductor can be stored and used to operate various vehicle systems, which improves the overall efficiency of the vehicle.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF A PREFERRED EMBODIMENT

Figure 1:
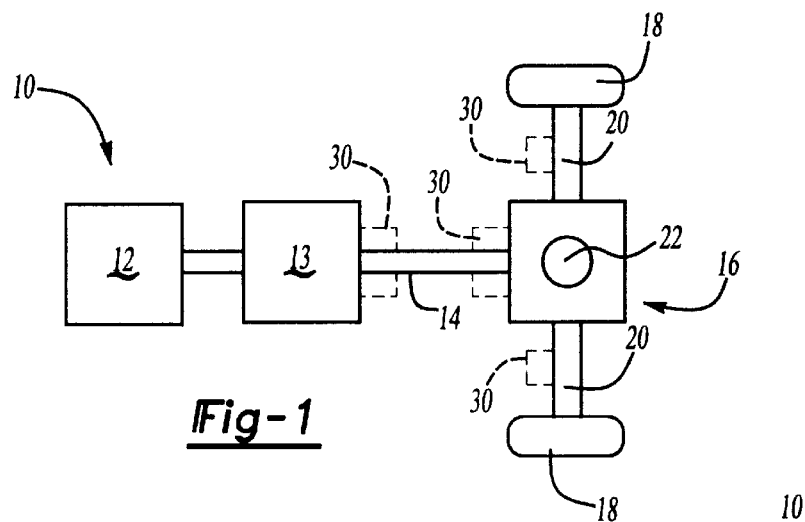
FIG. 1 is a schematic view of a drive train utilizing the subject invention.

Referring to the Figures, wherein like numerals indicate like or corresponding parts throughout the several views, a vehicle with a drive train system is shown generally at 10 in FIG. 1. The vehicle drive train 10 includes an engine 12, a transmission 13, a driveshaft 14, and a drive axle assembly, shown generally at 16. The drive train 10 can also include additional drive axles and non-drive axles, however, only one is shown for description purposes. Also, other drive train components known in the art, such as transmissions and other gear boxes, for example, could also be included within the drive train.

The engine 12 provides power to the axle assembly 16 via the driveshaft 14. The axle assembly 16 extends between a pair of wheels 18 and includes a pair of rotating axle shafts 20 for driving the wheels 18. The driveshaft 14 provides input torque and speed to a differential 22 in the axle assembly 16. The differential 22 transfers the toque from the driveshaft 14 to the axle shafts 20.

Figure 2:
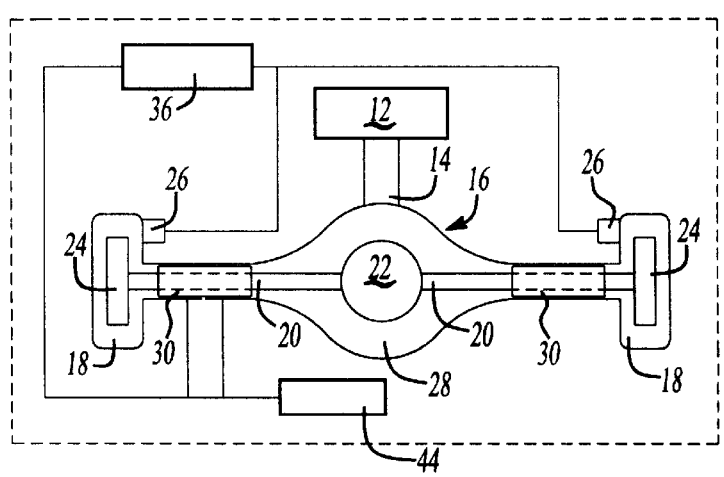
FIG. 2 is a schematic view of a preferred embodiment of the invention with the drive train incorporating the subject invention into a drive axle.

A braking system includes brake members 24, shown in FIG. 2, supported at each of the wheels 18. The braking system can use any type of brake known in the art including drum brakes, disc brakes, air brakes, or wet disc brakes, for example. The braking system also includes an actuator 26 for selectively moving the brake members 24 between an unactuated position and an actuated position. The braking system produces a braking force to slow and/or stop the rotation of the wheels 18 when the brake members 24 are in the actuated position. The braking system can be electrically controlled by the actuator 26 or controlled by other means known in the art.

The axle assembly 16 includes a housing 28 that surrounds the axle shafts 20 and the differential 22, holds in lubricating fluid and prevents external contaminants from interfering with the operation of the axle assembly 16. A retarding system 30 is supported by the axle assembly 16 and is used to assist the braking system with the slowing and stopping of the vehicle. In a staged system, the retarding system may also be used to slow the vehicle prior to the brakes being applied. The system can also be used in a vehicle drive mode to provide torque differential between axle shafts as detected by wheel rotation and engine throttle position.

It should be understood that the retarding system 30 can be located anywhere on the drive train. The effectiveness of the retarding system 30 is greatest when used in conjunction with a large diameter component and when rotational speed is maximized. The preferred location for maximizing speed would be between the engine 12 and the transmission 13 because the engine output shaft/transmission input shaft has the highest rate of rotation. However, there is limited packaging space at this location for a retarding system 30. Another preferred location would be between the transmission 13 and the differential 22. The greatest diameter is typically near the transmission 13 or before the differential 22. Another preferred location is to incorporate the retarding system 30 into the axle assembly 16 because there is enough packaging space to easily incorporate such a system and it is protected from debris and elements of the weather. This embodiment is discussed in detail below. The retarding system would operate and be similarly configured at the various locations on the driveline.

Figure 3:
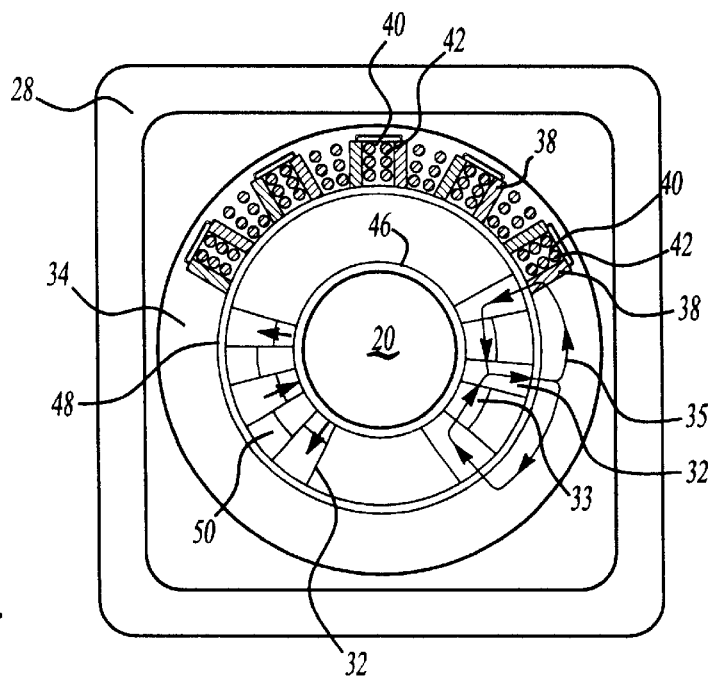
FIG. 3 is a cross sectional schematic view of the axle shown in FIG. 1.

The retarding system includes at least one magnet 32, shown in FIG. 3, supported for rotation with the axle shaft 20. An inductor 34 is held fixed independently from the magnet 32, and high permeability soft magnetic material 33 is placed between the permanent magnets 32. The retarding system 30 produces a retarding force as the magnet 32 rotates with respect to the inductor 34 to slow the rotation of the axle shaft 20 and thus the wheels 18 when the actuator moves the brake members 24 to the actuated position. Preferably, a plurality of magnets 32 is used. The retarding force is created by the current and voltage induced by the changing magnetic field as the magnets rotate inside of the stationary inductor 34. The power generated acts to retard the rotation of the axis shafts 20.

Various types of magnet configurations could be used. As shown in FIG. 3, radial magnets 32 are spaced about the axle shaft 20 with flat high permeability magnetically soft material 33 placed between the radial magnets. Optionally, the flat pieces between the radial magnets could also be flatter permanent magnets. Another option is to use smaller radial magnets mounted on a soft iron cylinder with flattened surfaces or flat grooves machined in the core.

Figure 4:
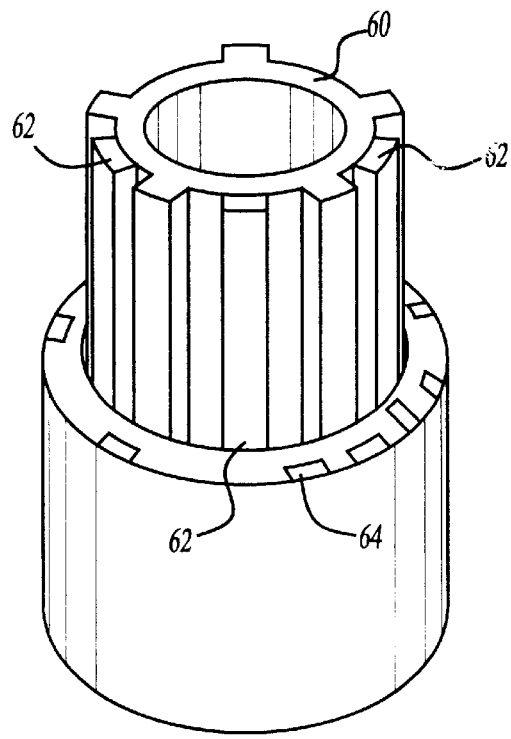
FIG. 4 is a perspective view, partially cut away, of one embodiment of the subject invention.

FIG. 4 shows an alternate configuration of the retarding system. Radial magnets 62 surround a soft iron core 60 of cylindrical shape that fits around the drive axle. Laminated C-cores 64 are placed around the core 60 and magnets 62. The laminated C-cores 64 will be discussed in greater detail below.

The retarding system 30 includes an ON and OFF position. The retarding system is in the OFF position when the brake members 24 are in the unactuated position and in the ON position when the brake members 24 are in the actuated position. Thus, the retarding system 30 is actuated when the vehicle is being braked. This prevents the occurrence of a retardation force acting on the axle shafts 20 during normal driving operation because no electrical current is being produced. At slow vehicle speeds such as less than five miles per hour, for example, the retarding system is usually OFF because the additional braking force is not needed. The components and operation of the retarding system 30 will be discussed in greater detail below. Although it is preferred that the system move between the ON/OFF positions with brake actuation, it should be understood that other control algorithms such as "staged" or "proportional" systems, for example, may be used. As an example, it may be determined valuable to actuate the system to slow rotation at a time when no braking has been requested. As a second example, it may be determined to be valuable to use only part of the full amount of retardation, such as when driving down hill at constant speed. A feedback control algorithm or other type of proportional controller could be used to regulate the degree of retardation.

A controller 36, shown in FIG. 2, such as a computer or other control means known in the art, is used to control the braking system and the retarding system 30. The controller 36 sends an electric control signal to the actuators 26 to move the actuators 26 from the unactuated position to the actuated position when vehicle braking is required. At the same time, the controller 36 sends a control signal to place the retarding system 30 to the ON position. Thus, the controller 36 simultaneously sends output to control the actuators 26 and the retarding system 30 based on the braking requirement input supplied to the controller 36. The controller 36 can also send a signal to the actuators 26 when a predetermined event occurs, such as the vehicle coasting down a hill, for example, so that the vehicle can be slowed without braking.

In the preferred embodiment shown in FIG. 3, a plurality of magnets 32 are supported along the length and about the circumference of the axle shafts 20 and the inductor 34 is comprised of induction members 38 each having a core 40 and copper wire 42 with a plurality of turns. The magnets 32 are fixed for rotation with the axle shaft 20, and the housing 28 supports the inductor 34. As the axle shaft 20 rotates with respect to the housing 28, the magnets 32 impose an alternating magnetic field on the cores 40. This creates an induced voltage in the windings. The number of turns in the copper wire determines the voltage output. Thus, the retarding system 30 also acts as a generator of energy that can be stored in an accumulator 44 (see FIG. 2), such as a battery storage or capacitor charge, for example.

The energy stored in the accumulator 44 can be selectively released back to the drive train or other electrical components in the vehicle under certain conditions. For example, if additional electrical power is required to operate the braking system, the energy from the accumulator 44 can be transferred via an electrical connection to the brake actuators 26. Or, the accumulator 44 can transfer energy via an electrical connection with the controller 36 to produce electric control signals for providing power to the braking system or to other vehicle systems. The retarding system 30 thus includes a dual function of providing a retarding force to assist with vehicle braking and regenerating operating power for vehicle systems.

The method for simultaneously retarding the speed of the vehicle and regenerating operating power for vehicle systems includes the following steps: a) providing an axle assembly 16 with a housing 28 extending between a pair of wheels 18 and an axle shaft 20 for driving the wheels 18; b) generating a braking force to slow rotation of the wheels 18; c) generating a magnetic field between the axle shaft 20 and the housing 28 during braking that generates electrical current to produce a retarding force to additionally slow rotation of the wheels 18; and d) storing energy generated by the magnetic field in an accumulator 44.

Additional steps include operating a vehicle system with energy stored in the accumulator 44; mounting an inductor 34 to the housing 28 and at least one magnet 32 to the axle shaft 20 before step (c); and providing a gap 48 between the inductor 34 and the magnet 32.

The gap 48 between the inductor 34 and the magnet 32 is preferably 0.5–1.0 millimeters, to avoid damage to the retarder as the axle assembly 16 flexes. However other gap sizes could be used.

The rotating portion of the retarder that is placed around the drive axle can have different configurations. In one embodiment shown in FIG. 3, permanent magnets 32, 33 are supported on a non-magnetic base 46. Identical radial magnets 32 can be alternated such that each one has an opposite polarity as indicated by the arrows shown in opposing directions. Additional magnets 32 placed along the circumference that have polarity in the same direction, indicated by arrows orientated in the same direction, add to a magnetic field 35 that is generated by the radial magnets. Stationary soft magnetic cores 40, wound with copper wire 42, are coaxial around the permanent magnets 32, 33, and are separated by gap 48. The magnetic field 35 generated by the permanent magnets 32, 33 magnetizes the soft magnetic cores 40. As the axle 20 rotates, the magnetic field 35 changes direction. In turn, this causes the magnetic polarity of the soft iron cores 40 to change direction so that energy is generated through the copper windings 42.

Ceramic magnets and rare earth magnets such as Neodymium-Iron-Boron, for example, are types of permanent magnet cores that can be used. Two examples of wound cores that can be used are laminates similar to those used in motors, and C-core type laminates. While these types of magnets are preferred, other magnets known in the art could also be used.

Preferably, the magnets used in the retarding system are attached to the axle assembly 16 either directly or through a soft iron core. If permanent magnets are used, it is preferable to use a non-magnetic spacer such as a brass or polymeric material, for example. If either radial magnets or radial magnets interspersed between soft iron poles are used, then the magnets should be mounted to a soft iron base that is attached to the axle. The iron core can be screwed into the axle assembly 16 or fixed with splines machined in the axle assembly and rotating cylinder. C-cores can be either fixed in a circle that is coaxial with the axle shaft 20 and attached to the axle housing 28 or can be mounted to a non-magnetic base and attached to the axle housing 28.

Each magnet 32 placed on the axle shaft will have a certain magnetic pole. The poles, i.e. the magnets 32, must be spaced apart from one another sufficiently to ensure that the magnetic flux completes a circuit through the inductor. As shown in FIG. 2, spaces 50 are located between each of the magnets 32. Preferably, the inductor 34 will be supported on the axle housing 28 in 360° coverage about the axle shaft 20, however, coverage could be less than 360°. The inductor preferably includes a series of insulated laminations with the appropriate shape stamped from the center, or a series of laminated C-cores that are surrounded by copper wire. The laminations need to be perpendicular to the pole faces of the magnets 32. As the axle rotates, the magnetic poles pass across the C-core or laminated electrical steel poles to induce voltage in the coil. The magnitude of the voltage is proportional to the velocity.

Figure 5:
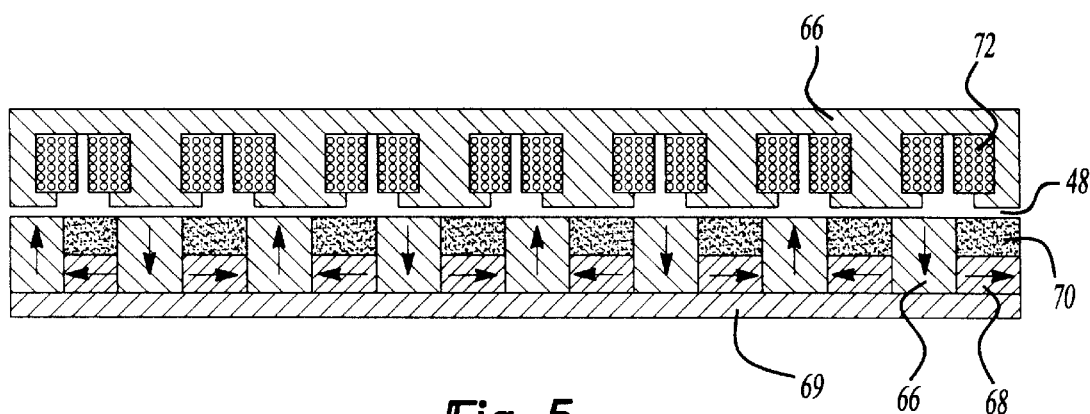
FIG. 5 is a schematic view of one magnet and laminate configuration.

An alternate embodiment is shown in FIG. 5, where magnetically soft-solid or laminated steel bars/poles 67 are positioned between permanent magnets 68. The arrow designates the magnetization direction. Non-magnetic, non-conductive filler 70 are located between the magnetically soft steel poles 67 to provide strength and durability. A layer of non-magnetic metal 69 is mounted below the magnets and poles to provide magnetic isolation. This permanent magnet assembly is fixed around the axle shaft 20.

The inductor 34 (FIG. 3) is located on the opposite side of gap 48 from the magnet assembly. The inductor 34 is made from laminated electrical steel cores 66 that are perpendicular to the axis of the axle shaft 20. Each of the poles in the shaft is wound with copper wire so that when the magnet assembly rotates, a voltage is induced in the wire. The wire can be potted to avoid damage during vibration or flexing of the axle housing 28.

Figure 6:
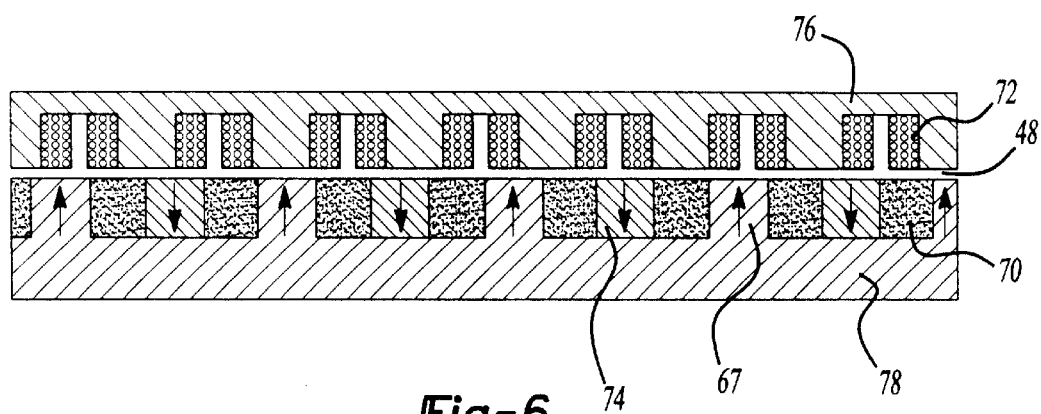
FIG. 6 is a schematic view of an alternate magnet and laminate configuration.

FIG. 6 shows the details of another embodiment of the inductor 34 and magnet assembly that is similar a version of FIG. 3. The magnet assembly includes a strong permanent magnet 74, typically a rare earth magnet such as neodymium-iron-boron composition that will magnetize the soft steel bar or laminated poles 67. This is mounted on a soft-steel solid or laminated cylinder 78. A non-magnetic and non-conductive material 70 is placed between the magnet and the poles for strength and durability.

The turns of copper wire 72 are wound around the poles of a laminated steel core 76. The core 76 can be made of adjacent C-cores as shown in FIG. 3, or other structures known in the art could also be used. However, the laminations are essentially parallel to the radial direction. As in FIG. 5, the poles are wound with copper wire 72 and may be potted for strength and durability.

FIGS. 5 and 6 are drawn linearly as though unwinding the retarder from the axle. It should be understood that FIGS. 5 and 6 are only examples of magnet and laminate orientations and that other configurations could also be used. For example, the inductors 34 of FIGS. 5 and 6 or the magnet assemblies of FIGS. 5 and 6 can be interchanged Also, induction in the axle wall should be avoided. If this occurs, eddy currents and magnetic hysteresis will cause retardation. However, the high permeability circular core between the magnets 32 and the axle wall, and the large distance between the magnets 32 and the wall, will minimize these effects.

As discussed above, the number of turns in the copper wire in the inductor determines the voltage output. To achieve a desired voltage output, one skilled in the art can vary the number of turns in the wire. Induced voltage can be determined from the following formula: $V=nA(\delta B/\delta t)$ wherein "V" is the voltage at the coil, "n" is the number of turns around the core, "A" is the area of the pole, "B" is the flux density in the core, and "t" is time. The derivative $\delta B/\delta t$ can be approximated to $\Delta B/\Delta t$.

This unique retarding system uses the axle shaft rotation as a means to electrically power an accumulator to release stored energy back into the drive train during specified vehicle events while simultaneously providing magnetic resistance to slow the rotation of the axle shaft during braking events. The system can also be used during non-braking events such as coasting down a hill, as discussed above. This increases brake lining durability and fuel economy with a simple cost effective design that is silent in operation and adds minimal weight to the vehicle.

The invention has been described in an illustrative manner, and it is to be understood that the terminology that has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

We claim:

1. A vehicle drive unit assembly comprising:
   a drive axle extending between a pair of wheels and including an axle shaft for driving said wheels;
   a braking system including a brake member supported on each of said wheels and an actuator for selectively moving said brake members between an unactuated position and an actuated position, said braking system for producing a braking force to slow the rotation of said wheels when said brake members are in said actuated position; and a retarding system including at least one magnet mounted to said axle shaft for rotation with said axle shaft and an inductor held fixed independently from said magnet, said retarding system for producing a retarding force as said magnet rotates with respect to said inductor to slow the rotation of said wheels when said actuator moves said brake members to the actuated position.

2. An assembly as set forth in claim 1 wherein said retarding system includes an ON and OFF position, said retarding system being in said OFF position when said brake members are in said unactuated position and in said ON position when said brake members are in said actuated position.

3. An assembly as set forth in claim 2 including a controller having at least one input and at least one output output, said controller for simultaneously controlling said actuator and said retarding system based on said input.

4. An assembly as set forth in claim 3 wherein said actuator is electrically controlled by said controller such that an electronic signal is produced by said controller to move said brake members from said unactuated position to said actuated position.

5. An assembly as set forth in claim 4 including an accumulator for storing energy produced by said retarding system as said magnet rotates with respect to said induction member.

6. An assembly as set forth in claim 5 including an electrical connection between said accumulator and said controller wherein the energy stored in said accumulator is transmitted to said controller via said electrical connection to provide energy to produce said electrical signal.

7. An assembly as set forth in claim 1 wherein said at least one magnet is comprised of a plurality of magnets supported along the length and about the circumference of said axle shaft and wherein said inductor is comprised of induction members each having a core and copper wire with a plurality of turns.

8. An assembly as set forth in claim 1 wherein said axle shaft is supported for rotation with respect to an axle housing, said magnet being directly attached to said axle shaft and said inductor being supported by said housing.

9. An assembly as set forth in claim 1 wherein said at least one magnet is comprised of a plurality of magnets supported along the length and about the circumference of said axle shaft and wherein said inductor is comprised of a plurality of insulated laminations having similar cross-sectional shape.

10. An assembly as set forth in claim 1 including a proportional controller having an input and an output, said controller for regulating the degree of retardation based on said input.

11. A vehicle comprising:

an engine;

an axle having a housing extending between a pair of wheels and including an axle shaft rotatably supported with respect to said housing for driving said wheels;

a driveshaft extending between said engine and said axle, said driveshaft for providing input to said axle shaft to drive said vehicle wheels;

a braking system including a first brake member supported on one of said wheels, a second brake member supported on the other of said wheels, and an actuator for selectively moving said first and second brake members between an unactuated position and an actuated position, said braking system for producing a braking force to slow the rotation of said wheels when said first and second brake members are in said actuated position; and a retarding system including at least one magnet supported for rotation with said axle shaft and an inductor mounted to said housing, said retarding system for producing a retarding force as said magnet rotates with respect to said inductor to slow the rotation of said wheels when said actuator moves said first and second brake members to the actuated position.

12. A vehicle as set forth in claim 11 including an accumulator for storing energy produced by said retarding system as said magnet rotates with respect to said induction member.

13. A vehicle as set forth in claim 12 including a controller for electrically controlling said braking system and said retarding system wherein said controller produces a first signal to move said brake members from said unactuated position to said actuated position and a second signal to activate said retarding system once said brake members are in the actuated position.

14. A vehicle as set forth in claim 13 including an electrical connection between said accumulator and said controller wherein the energy stored in said accumulator is transmitted to said controller via said electrical connection to provide energy to produce said first and second signals.

15. A method for simultaneously retarding the speed of a vehicle and regenerating operating power for a vehicle system comprising the steps of:

a) providing a drive axle powered by an engine and including an axle housing extending between a pair of wheels with a rotating member for driving the wheels;

b) generating a braking force to slow rotation of the wheels;

c) generating a magnetic field between the rotating member and the axle housing during braking to produce a retarding force to additionally slow rotation of the wheels; and d) storing energy generated by the magnetic field in an accumulator.

16. A method as set forth in claim 15 including the step of operating a vehicle system with energy stored in the accumulator.

17. A method as set forth in claim 16 wherein the rotating member is an axle shaft and including the steps of mounting an inductor to the axle housing and at least one magnet to the axle shaft before step (c).

18. A method as set forth in claim 17 including the step of providing a gap between the inductor and the magnet.

19. A method as set forth in claim 15 including the step of using a proportional controller to vary the retarding force.

20. A vehicle drive unit assembly comprising:

a driveshaft driven by an engine;

an axle extending between a pair of wheels and including an axle shaft coupled to said driveshaft for driving said wheels;

a retarding system having an actuated position and an unactuated position, said retarding system including at least one magnet mounted for rotation with at least one of said driveshaft or axle shaft and an inductor held fixed independently from said magnet wherein said retarding system selectively produces a retarding force as said magnet rotates with respect to said inductor to slow the rotation of said driveshaft or axle shalt when said retarding system is in said actuated position; and a controller for moving said retarding system between said actuated and unactuated positions.

21. An assembly as set forth in claim 20 including a braking system with a brake member supported on each of said wheels and an actuator for selectively moving said brake members between a rest position and an applied position, said braking system for producing a braking force to slow the rotation of said wheels when said brake members are in said applied position wherein said controller moves said retarding system to said actuated position when said brake members are in said applied position.

22. An assembly as set forth in claim 21 wherein said retarding system produces energy as said magnet rotates with respect to said inductor and wherein the drive unit assembly includes an accumulator for storing said energy.

23. An assembly as set forth in claim 22 wherein said energy stored in said accumulator is transmitted to a vehicle system to provide operational power.

24. An assembly as set forth in claim 21 wherein said controller is a proportional controller for varying said retarding force on said driveshaft or axle shaft based on a pre-determined condition.

25. A vehicle drive train assembly comprising:

an engine;

an axle having a housing extending between a pair of wheels and including an axle shaft rotatably supported with respect to said housing for driving said wheels;

a driveshaft extending between said engine and said axle, said engine for providing driving input to said axle shaft via said driveshaft to drive said vehicle wheels;

a braking system including a brake member supported on each of said wheels and an actuator for selectively moving said brake members between an unactuated position and an actuated position, said braking system for producing a braking force to slow the rotation of said wheels when said brake members are in said actuated position; and a retarding system including at least one magnet separated from an inductor to define a gap such that said magnet and inductor can move relative to one another without interference wherein said magnet is directly mounted to either one of said housing or to one of said axle shaft or driveshaft and said inductor is directly mounted to the other of said axle shaft or driveshaft or to said housing, said retarding system for producing a retarding force as said magnet and inductor move relative to one another to slow the rotation of said wheels when said actuator moves said brake members to the actuated position.

26. An assembly as set forth in claim 25 including a controller for moving said retarding system between said actuated and unactuated positions.

27. An assembly as set forth in claim 26 wherein said controller has at least one input and at least one output, said controller for simultaneously controlling said actuator and said retarding system based on said input.

\* \* \* \* \*